(12) United States Patent
Saito

(10) Patent No.: US 7,691,772 B2
(45) Date of Patent: Apr. 6, 2010

(54) CATALYST AND METHOD FOR PRODUCING CATALYST

(75) Inventor: Masayuki Saito, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 569 days.

(21) Appl. No.: 10/586,550

(22) PCT Filed: Mar. 22, 2005

(86) PCT No.: PCT/JP2005/005116

§ 371 (c)(1),
(2), (4) Date: Jul. 19, 2006

(87) PCT Pub. No.: WO2005/092493

PCT Pub. Date: Oct. 6, 2005

(65) Prior Publication Data

US 2008/0242533 A1    Oct. 2, 2008

(30) Foreign Application Priority Data

Mar. 25, 2004    (JP)    ............................. 2004-090350

(51) Int. Cl.
B01J 31/00    (2006.01)
B01J 23/00    (2006.01)
B01J 23/40    (2006.01)
B01J 23/42    (2006.01)
B01J 23/44    (2006.01)

(52) U.S. Cl. .................. 502/159; 502/162; 502/166; 502/170; 502/173; 502/325; 502/326; 502/339

(58) Field of Classification Search ................ 502/159, 502/162, 166, 170, 173, 325, 326, 339
See application file for complete search history.

(56) References Cited

U.S. PATENT DOCUMENTS 3,470,019 A  *  9/1969  Steele .................. 502/326
3,830,756 A  *  8/1974  Sanchez et al. .......... 502/304

(Continued)

FOREIGN PATENT DOCUMENTS

JP    59-160536    9/1984

(Continued)

OTHER PUBLICATIONS

Search Report for PCT/JP2005/005116.*

(Continued)

*Primary Examiner*—Patricia L Hailey
(74) *Attorney, Agent, or Firm*—Roberts & Roberts, LLP

(57) ABSTRACT

The present invention provides a method for producing a catalyst comprising the steps of: producing a metal salt solution containing salts of one or more metals; dispersing the metal salt solution, an organic matter and a porous carrier made of one or more metal oxides in a solvent to form a composite complex comprising one or more metal ions having 10 to 50,000 atoms, the organic matter bonded to the metal ions, and simultaneously make the composite complex carried on the porous carrier; and calcining the carrier having the composite complex carried thereon. The method may further comprise a step of reducing the metal ions on the porous carrier by reducing the carrier, after the step of making the composite complex carried on the carrier.

17 Claims, 1 Drawing Sheet

U.S. PATENT DOCUMENTS

| | | | | |
|---|---|---|---|---|
| 4,537,873 | A | | 8/1985 | Kato et al. .................. 502/242 |
| 5,641,723 | A | | 6/1997 | Bonnemann et al. ........ 502/326 |
| 6,083,467 | A | | 7/2000 | Takeshima et al. .......... 423/335 |
| 6,440,378 | B1 | | 8/2002 | Hirata et al. ............. 423/239.1 |
| 2003/0083194 | A1 | * | 5/2003 | Sung .......................... 502/304 |
| 2003/0187294 | A1 | * | 10/2003 | Hagemeyer et al. ......... 560/241 |
| 2004/0209760 | A1 | * | 10/2004 | Yoshikawa ................... 502/65 |
| 2005/0032915 | A1 | * | 2/2005 | Nakagawa et al. ............. 516/4 |
| 2005/0261125 | A1 | * | 11/2005 | Sagae ........................ 502/325 |

FOREIGN PATENT DOCUMENTS

| | | | |
|---|---|---|---|
| JP | 60-50491 | | 3/1985 |
| JP | 63-116741 | | 5/1988 |
| JP | 08-506757 | | 7/1996 |
| JP | 10-216517 | | 8/1998 |
| JP | 2000-279818 | * | 10/2000 |
| JP | 2000-279824 | * | 10/2000 |
| JP | 2000-296339 | * | 11/2000 |
| JP | 2002-001119 | | 1/2002 |
| JP | 2002-102701 | * | 4/2002 |
| WO | WO99/32223 | | 7/1999 |
| WO | WO 2004/076531 | | 9/2004 |

OTHER PUBLICATIONS

Asakura, Kiyotaka, et al. "In-Situ Polarization-Dependent Total-Reflection Fluorescence XAFS Studies On The Structure Transformation of Pt Clusters on $\alpha$-$Al_2O_3$(0001)." Journal of Physical Chemistry. B, Materials, Surfaces, Interfaces and Biophysical, vol. 101, No. 28, 1997, pp. 5549-5556.

Lang, et al. "Dendrimer-Encapsulated Nanoparticle Precursors To Supported Platinum Catalysts." Journal of the American Chemical Society, vol. 25, No. 48, 2003, 125, pp. 14832-14836.

Database WPI Week 200464, Thomson Scientific, London, GB; AN 2004-661998.

* cited by examiner

CATALYST AND METHOD FOR PRODUCING CATALYST

TECHNICAL FIELD

The present invention relates to a catalyst applicable to various uses such as cleaning of automotive exhaust gases and gases containing VOC (volatile organic compound), and to a method for producing the same. The present invention particularly relates to a catalyst with adequate activity and durability, which has catalyst particles having a preferable number of atoms and a preferable particle size carried on a carrier.

BACKGROUND ART

A catalyst has been used in many fields including various fields such as cleaning of various gases, in addition to the acceleration of a reaction such as a compound synthesis reaction and a fuel cell reaction. Many of traditionally used catalysts have a structure consisting of a porous body of a metal oxide such as alumina and silica or of carbon as a carrier, and an active metal, particularly a precious metal such as platinum, palladium and rhodium carried thereon.

In addition, recently, a multicomponent catalyst having a plurality of precious metals carried thereon for the purpose of improving activity has been commonly used. The alloying of the catalytic metal means to dissolve two or more active metals in each other, for instance, like platinum and palladium, or platinum and rhodium, and many of alloyed metals tend to show improved activity by interaction between constituent elements, which is a characteristic not seen in a catalyst having a single metal carried thereon. It is also expected that the alloying of the catalytic metals enhances interaction with the carrier and consequently shows the effect of inhibiting the deactivation of the catalyst.

Furthermore, on the carrier as well, effects of various carriers in addition to alumina, silica and carbon have been studied. For instance, in a field of a catalyst for treating an automotive exhaust gas, in order to smooth the atmosphere fluctuation of an exhaust gas atmosphere, a carrier added with ceria having oxygen occlusion discharge capability or with a ceria-zirconia solid solution having the oxygen occlusion discharge capability peculiar to the ceria and improved heat resistance has been recently used.

A conventional catalyst is normally produced by the steps of: impregnating a metal salt solution such as dinitrodiammineplatinum, chloroplatinic acid and rhodium nitrate in a porous oxide carrier; making an atomic metal carried on the carrier; and then calcining the carrier in a reducing atmosphere. In addition, a multicomponent catalyst is also produced by the steps of: preparing a metal salt solution containing a plurality of metals to be carried; mixing it with a carrier to make a plurality of metal ions adsorbed on the carrier; and drying and calcining it. The conventional catalyst produced by these production methods has a form in which the atomic metal particles are carried on the carrier.

[Patent Document 1]: Japanese Patent Application Laid-Open No. 60-50491

[Patent Document 2]: Japanese Patent Application Laid-Open No. 63-116741

This is because the activity of a catalyst is greatly affected by the state of carried catalyst particles when the catalyst carries the same metal and the same amount thereon, and the catalyst having a catalytic metal carried thereon in the state of clusters formed of gathering atoms shows higher catalytic activity than a catalyst having the catalytic metal dispersed and carried thereon in the state of atoms. The conventional catalyst is heat-treated so as to migrate atoms of the metal carried in an atomic state and cohere them into a catalyst particle having a functionable particle size. However, there are such problems as described below in the conventional catalyst.

The first problem of a conventional catalyst is a problem in controlling a particle size. When the catalyst is conventionally heat-treated, which is an indispensable step, it is not strictly taken into account how many atoms constitute a catalyst particle. Specifically, it is difficult to completely control a catalyst particle size of the conventional catalyst, so that the particle size of the catalyst particles is often ununiform. The catalyst having such ununiform catalyst particles shows inferior activity.

In addition, a conventional catalyst in a form of an alloy catalyst carries the alloy thereon often ununiformly distributed, and carries metals thereon often insufficiently alloyed. The alloyed metal requires that the atoms of constituent elements exist in the vicinity of each other atom, but in a catalyst having the atomic metal carried thereon in a conventional way, the metals are ununiformly distributed because of the difference of a zeta potential between them (difference of adsorptivity), so that the metal with high adsorptivity tends to be adsorbed on the surface of a carrier when heat-treated, whereas the metal with low adsorptivity is hardly adsorbed on the carrier surface and diffuses into the inner parts of pores in the carrier. Even if the carrier in such a state would be calcined, the metals with the high adsorptivity cohere with each other to form the catalyst particles on the carrier surface, whereas the metals with the low adsorptivity cohere with each other to form the catalyst particles in the inner parts of the carrier, so that the catalyst particle of a uniform alloy cannot be formed even though the carrier is thoroughly heat-treated. In addition, the insufficiently alloyed catalyst becomes inferior in activity, particularly initial activity right after having been produced, while being associated with the above described problem with the particle size of the catalytic metal particle.

A conventional catalyst is also required to improve the durability which is the capability of maintaining its activity for a long period. The durability constitutes a matter of concern in an application field used at a high temperature like a catalyst for cleaning an exhaust gas, and the cause of deterioration in activity is considered to be the migration and cohesion of catalyst particles caused by being heated during use. When the conventional catalyst is used in a high-temperature environment, the catalyst particles on a carrier become migratable by being released from the constraint by the carrier, and migrate, contact and cohere with the other catalyst particles to form coarse catalyst particles, so that the activity of the whole catalyst is deteriorated.

Furthermore, in a conventional catalyst, a state of catalyst particles tends to be affected by a type of a metal oxide of a carrier, so that the characteristics also tend to differ according to the type. For instance, in the case of the conventional catalyst which employs a metal oxide having comparatively low interaction to a metal, such as alumina, as the carrier, even though the catalyst carries metal atoms thereon, the metal atoms can easily migrate and cohere by subsequent heat treatment. However, in such a catalyst, the catalytic metal easily migrates even by heat onto the catalyst during use, forms coarse catalyst particles at a comparatively early stage, and loses its activity. On the other hand, in the case of the conventional catalyst which employs a metal oxide having comparatively strong interaction to a metal, such as ceria, as the carrier, catalytic metal atoms are locked in the carrier and become hardly migratable in a stage of having been carried by the carrier, and hardly cohere into an appropriate particle size even by heat treatment. As described above, the conventional catalyst acquires different characteristics according to the type of the carrier, and needs to select the carrier in accordance with use, which require a lot of complicated troubles in controlling products to a catalyst maker.

Under the circumstances, an object of the present invention is to provide a catalyst having catalyst particles formed on a carrier in an optimally carried state, so as to solve the above described problems of the conventional catalyst; and a production method therefor. Another object of the present invention is to provide a catalyst showing high activity and high durability not only in a comparatively-low-temperature environment but also in a high-temperature environment and to provide a production method therefor.

DISCLOSURE OF THE INVENTION

As a result of extensive studies to solve the above described problems, the present inventor has found that a catalyst produced by predetermined production steps has catalyst particles thereon which are formed of gathering catalytic metal atoms into the preferable number and are dispersed on a carrier; and conceived the present invention.

Specifically, the present invention provides a catalyst comprising a composite complex made of one or more metal species having 10 to 50,000 atoms and an organic matter bonded to the metal species, the composite complex carried on a calcined porous carrier made of one or more metal oxides or carbon.

Though a conventional catalyst has catalyst particles formed thereon by cohering an atomic metal through calcining treatment, the catalyst according to the present invention has catalyst particles with a controlled particle size (number of atoms) produced by the steps of: previously forming a composite complex (hereafter may be called merely a complex) including 10 to 50,000 catalytic metals, and making the composite complex carried on a carrier.

In the next place, the catalyst according to the present invention will be described in detail, while associating it with a production method therefor. The catalyst according to the present invention is produced, at first, by producing a metal salt solution. Here, metal ions in the metal salt solution compose catalyst particles, so that a preferred metal is platinum, palladium, rhodium, iridium, gold, silver, ruthenium or osmium. The metal salt solution may include only one type of these metal ions, or two or more types of metal ions. By employing a solution containing a plurality of types of the metal salts, a multicomponent catalyst (for instance, platinum/palladium catalyst and platinum/rhodium catalyst) can have an alloy of both metals formed thereon. Here, such a complex as containing two or more types of metal ions can be formed by mixing a plurality of metal salts to be aimed in a solvent. In addition, in the present invention, the metal composing the catalyst particles may be lead, bismuth and selenium in addition to the above described precious metals (transition metals).

A metal salt to be specifically used when producing a complex containing platinum includes hexachlorplatinic acid, dinitrodiammineplatinum, dinitrodiammineplatinum nitrate, cis-diaminediaquaplatinum nitrate, trans-diaminediaquaplatinum nitrate, tetranitroplatinic acid, tetra(oxalato) platinic acid, cis-dinitrodiaquaplatinum, tetraammineplatinum hydroxide, hexaammineplatinum hydroxide, tetraammineplatinum chloride, hexaammineplatinum chloride, hexahydroxyplatinic acid, platinum oxide, platinum(I) chloride, platinum(II) chloride and potassium tetrachloroplatinate.

A metal salt to be used when producing a composite complex containing palladium includes palladium chloride, tetranitro palladate, palladium nitrate, dichlorodiamminepalladium, tetraamminepalladium nitrate, tetraamminepalladium chloride, tetraamminepalladium hydroxyl salt, trans-diaqua diaminepalladium nitrate, dinitrodiaminepalladium, bis(ethylenediamine)palladium nitrate and diaqua(ethylenediamine)palladium nitrate.

A metal salt to be used when producing a composite complex containing ruthenium includes ruthenium chloride, ruthenium nitrate, tetranitrosyl diaquaruthenium, ruthenium acetate, hexammineruthenium nitrate, pentaammineaquaruthenium nitrate, nitrosyl pentaammineruthenium nitrate and hydroxonitrosyl tetraamineruthenium nitrate.

A metal salt to be used when producing a composite complex containing rhodium includes rhodium chloride, rhodium nitrate, rhodium acetate, pentaammineaquarhodium nitrate, pentaamminenitrorhodium, triaquarhodium nitrate and hexaammineaquarhodium nitrate.

A metal salt to be used when producing a composite complex containing gold includes chlorauric acid, potassium aurate cyanide, potassium gold cyanide, tetraamminegold nitrate, tetranitratogold ammonium salt and diaqua(1,10-phenanthroline) gold nitrate. A metal salt to be used when producing a complex containing silver includes silver chloride, silver nitrate, silver acetate and silver lactate.

A metal salt to be used when producing a complex containing iridium includes hexachloroiridate, iridium trichloride, hydrogen hexanitro iridate, hydrogen tris(oxalato)iridate, pentaammineaquairidium nitrate, nitropentaammineiridium nitrite and hexaammineiridium nitrate.

An applicable solvent for producing a metal salt solution includes water and an organic solvent such as alcohol, but is preferably water.

The catalyst according to the present invention is produced subsequently by mixing an organic matter with a metal salt solution. Thereby, the organic matter bonds to metal ions dispersed in a solvent and forms a complex. When the organic matter thus forms the complex, it chemically and physically is bonded to the metal ions in the form of having captured the metal ions in the solvent, and forms a stable composite complex.

An organic matter composing a composite complex is preferably an organic compound capable of being physically adsorbed or chemically bonded to metal ions, and preferably has at least one of nitrogen, a carboxyl group, a carbonyl group and an alcohol group in the molecule. Specifically, the preferred organic matter is polyethyleneimine (hereafter may be called PEI), polyacrylic acid, polymethyl methacrylate, polyallylamine, polyvinylpyrrolidone, polyvinyl alcohol, poly(N-carboxymethyl)ethyleneimine, poly(N,N-dicarboxymethyl)arylamine, a copolymer thereof, a polyamino acid or a polysaccharide. When these organic matters form the complex with metal ions, a pattern in which the complex is formed differs according to a type of a substituent in the organic matter. For instance, in the case of PEI, nitrogen is the substituent for forming the complex, and forms the complex through a coordinate bond with the metal ion, whereas in the case of polyacrylic acid, a carboxyl group is a substituent for forming the complex, and forms the complex through an ionic bond with the metal ion. Thus, the organic matter and the metal ions are bonded to each other by some interaction due to the substituent in the organic matter, and form the complex.

In the following description, "bond" indicates a concept including coordination and interaction.

It is possible to control the number of metal ions in a composite complex (particle size of catalyst particle) into a range of 10 to 50,000, by controlling a molecular weight of an organic matter to be mixed. The number of the metal ions in the composite complex just becomes the number of metal atoms in the catalyst particles after having been carried on a carrier. A method of controlling the number of the metal ions in the composite complex will be described below while taking the case of using PEI of the organic matter, for instance.

A factor of determining a particle size of catalyst particles in the present invention is (1) the number of such substituents in an organic matter as to be capable of interacting with a metal, and (2) a molar ratio of the mixing metal to the organic matter. When a complex containing platinum is formed by using polyethyleneimine as the organic matter and dinitrodiammineplatinum as the metal, platinum coordinates with a nitrogen atom in PEI, and one platinum atom coordinates with two ethyleneimine monomers. Here, the ethyleneimine monomer has a molecular weight of 43.07, so that PEI with a molecular weight of 50,000 has a polymerization degree of about 1,160 (consists of about 1,160 ethyleneimines). Accordingly, when PEI with a molecular weight of 50,000 reacts with platinum without excess or deficiency, one molecule of PEI can react with 580 atoms of platinum to form a complex.

Accordingly, it is considered in the present invention that the whole PEI with a molecular weight of 50,000 can coordinate with 580 atoms of platinum, and form the complex and consequent a platinum particle containing 580 atoms as a catalyst particle, but the present inventors have found that the catalyst cannot be formed by such simple blending. This is because the nitrogen atoms in PEI are sites for keeping a macromolecule organic matter soluble in water, and accordingly because the complex having all nitrogen sites coordinated with platinum (in other words, having PEI react with platinum without excess or deficiency) loses water solubility, precipitates, and consequently can not be used for a complex solution.

The present inventors have investigated an appropriate condition for PEI, and confirmed that a mixing ratio of PEI with platinum is preferably a ratio of four nitrogen atoms to one platinum atom in order to secure the water solubility of a complex. (In other words, it is necessary to supply more PEI to the reaction than that needed for completely reacting with platinum and cause the lack of platinum). When PEI is blended with platinum at such a ratio, it forms a composite complex containing 290 coordinated atoms of platinum in one PEI molecule, which subsequently forms a cluster-shaped catalyst particle consisting of 290 atoms of platinum. Thus formed catalyst particle acquires a particle size of about 2.5 nm after having been subjected to reduction treatment.

A method in the present invention can thus adjust the number of the metal ions in a composite complex, by increasing or decreasing a molecular weight of an organic matter (by increasing or decreasing the number of substituents) to adjust the number of metal ions bonded to the organic matter through an interactive reaction. However, as was described in the above case, in order to secure the water solubility of the composite complex, it is preferable to mix the organic matter with the metal at a lower ratio for metal ions (an excess ratio for the organic matter) than a ratio in which a metal is bonded to the substituent in the organic matter through the interactive reaction so as not to cause an excess or deficiency state. It is also preferable to employ the organic matter with a molecular weight of 1,000 to 250,000, but it is also possible to employ the organic matter with a lower molecular weight when the polymer chain is cross-linked through metal species.

As for a method of mixing an organic matter with a metal salt solution, it is acceptable to add the organic matter into the metal salt solution, but it is also acceptable to prepare a solution of the organic matter separately from the metal salt solution, and mix both of the solutions. It is also acceptable to simultaneously mix the metal salt and the organic matter in one solvent.

After a composite complex has been formed, the composite complex can be carried on a carrier by being contacted with a metal oxide or carbon to be a carrier. In the present invention, the type of the carrier is not limited in particular as long as the metal oxide is employed, and in the present invention, any type of the carrier can form catalyst particles thereon in a preferable condition. Accordingly, an applicable carrier includes a carrier containing ceria in addition to alumina, silica and zirconia, for instance, a mixture of an oxide of a rare earth metal with those, such as a ceria-zirconia mixture oxide and a ceria-zirconia-yttria mixture oxide. The carrier may also include at least one of aluminum, zirconium, silicon, titanium, lanthanum, cerium, neodymium and yttrium. As for a method of carrying the compound complex on the carrier, it is acceptable to add a metal oxide powder into a solution of the composite complex, but it is also acceptable to add the solution of the composite complex dropwise into a dispersion having the metal oxide powder dispersed therein. The method is not limited to them in particular.

In the above described step of carrying a composite complex, catalyst particles consisting of atomic metals cohering into a preferable number are carried on a carrier. According to the present inventors, it is possible to produce a catalyst having higher activity than a conventional catalyst, even when the catalyst has been calcined after the carrying step. In the present invention, catalytic metal atoms are carried in a state of already having cohered right after having been carried, so that cluster-shaped catalyst particles can be easily formed by the migration of catalyst particles in calcining treatment after a carrying step. Particularly, when a carrier having comparatively low interaction such as alumina is employed, the catalyst particles rapidly migrate due to the calcining treatment, and easily form a cluster-shaped particle due to the calcining treatment.

On the other hand, a cluster-shaped catalyst particle is formed also by subjecting a carrier having already carried a composite complex thereon, to reduction treatment and reducing metal ions on the carrier. Thus formed catalyst can be expected to show higher activity, particularly in a high-temperature environment.

The reduction treatment is preferably performed by the addition of a reducing agent. An applicable reducing agent includes hydrogen, formic acid, ethanol, methanol, propanol, butanol, formaldehyde, sodium borohydride, hydrazine, dimethylamine borane and trimethylamine borane.

As for a method of adding a reducing agent, it is acceptable to filtrate a complex solution containing a carrier, collect the carrier having metal ions carried thereon, and bring it into contact with the reducing agent, but it is a preferred method to directly add the reducing agent to the complex solution containing the carrier. The above method enables a series of treatments consisting of complex formation→complex carrying→reduction treatment to be performed in one solution, which extremely enhances a production efficiency for the catalyst. In the above case, it is preferable to employ the reducing agent with a comparatively strong reducing power, such as sodium borohydride and formic acid, for the reduction treatment. This is because the use of the reducing agent with the strong reducing power can decrease a reduction temperature and also shorten a reduction period of time. For reference sake, in the present invention, cluster particles are formed by reducing cohering metal ions which have been already fixed on a carrier, are stable even when formed by using the strong reducing agent, and do not form a coarse catalyst particle through abnormal cohering.

In the present invention, a gas such as hydrogen is also applicable as a reducing agent, and in this case, it is acceptable to make a carrier carry a complex, collect the carrier, and make the gas reduce the complex in a dry atmosphere. As for an advantage of the dry reduction process, a wet reduction process requires even water to be heated when heating a powder for reduction, whereas the dry reduction process requires only the powder to be heated, which is extremely advantageous in the viewpoint of energy saving and produces an advantage of having only to prepare an extremely small vessel for reduction. The above described reduction treatment may be performed in either timing before or after a calcining step.

In addition, the catalyst according to the present invention may further carry at least any of an alkali metal element, an alkaline earth metal element and a rare metal element thereon, as an auxiliary catalyst particle. When the catalyst according to the present invention is used as a catalyst for cleaning an exhaust gas, the above auxiliary catalytic metals can impart a NOx occlusion function to the catalyst. The catalyst having the auxiliary metal carried thereon can also strengthen a function as a catalyst for cleaning VOC, when used for the catalyst having hydrocarbon combustion activity. A preferably carried alkali metal element for the above purpose is lithium, sodium, potassium, rubidium and cesium; a preferably carried alkaline earth metal element is magnesium, calcium, strontium and barium; and as a preferably carried rare earth metal element is lanthanum and cerium.

These auxiliary catalyst particles are carried in a different amount according to a function required to a catalyst of a base. When the auxiliary catalyst particles are carried, for instance, on a catalyst for cleaning an exhaust gas to which a NOx occlusion function and the like are imparted, 5 to 40 wt % of the particles with respect to the catalyst are preferably carried on it. This is because when the carried amount is less than 5 wt %, the effect of the auxiliary catalyst particle is low; and because when the added amount is more than 40 wt %, the auxiliary catalyst particle does not only show any difference in the effect but also lowers basic catalytic activity, since the carried amount of the main catalyst particles (metal) decreases. On the other hand, when the auxiliary catalyst particles are carried on a catalyst for combusting VOC, 0.5 to 5 wt % of the particles are preferably carried on the carrier. This is because when the carried amount is less than 0.5 wt %, the. effect of the auxiliary catalyst particle is low; and because even when the added amount exceeds 5 wt %, the auxiliary catalyst particle shows not only little effect but also lowers the reaction activity. The amount of the carried auxiliary particles on the catalyst for combusting VOC is preferably the minimum amount in a range of matching the concentration of a component to be cleaned in an objective waste gas and an exhaust rate of the gas. As for the timing of the addition of the auxiliary metal, the auxiliary metal has only to be added before the catalyst is used. In other words, the auxiliary metal may already exist on the carrier when the catalyst is conditioned (when a composite complex is calcined and reduced after having been carried), or may be added to the catalyst already having passed through a calcining step and the like. As for a latter method, it is acceptable to employ an adding method of forming the catalyst into slurry, adding the auxiliary metal to the slurry and immersing a support in the slurry, which is occasionally employed, for instance, when producing a catalyst body having a catalyst supported by a honeycomb structure or the like.

As described above, the catalyst according to the present invention shows high reaction activity because of having the catalyst particle carried thereon of which the diameter (number of atoms) is controlled into a proper range, and also shows excellent durability because the catalyst particle is prevented from coarsening even when used for a long period of time.

The catalyst according to the present invention has a catalyst particle which is a cluster of an adequate number of metal atoms, on a carrier. This is because the catalyst employs a composite complex as a precursor for forming the catalyst particle, and the number of the metal atoms in the composite complex is controllable as described above. In addition, the catalyst according to the present invention is particularly useful in producing an alloyed catalyst particle. The catalyst having the suitably alloyed catalyst particle is produced by making the two or more metal atoms bonded to an organic matter to form the composite complex, calcining it and reducing it. The state of the catalyst cannot be expected to a conventional catalyst having a conventional atomic metal carried thereon, and is developed without selecting a type of a carrier.

A method for producing the catalyst according to the present invention can be said to be a comparatively simple method as a method for producing the catalyst. Specifically, the method according to the present invention can perform the production of a metal salt solution, the formation of a composite complex and the carrying of the composite complex onto a carrier in one apparatus (reactor), which is as simple as a conventional method of making the carrier carry atoms directly from a metal salt solution. In addition, it is acceptable also in the method according to the present invention to reduce a composite complex after it has been carried, but the method according to the present invention can shorten a period of time in treatment after the reduction treatment. Specifically, the method according to the present invention can rapidly reduce metal ions into catalyst particles with a preferred particle size, by applying a reducing agent having a strong reducing power (such as dimethylamine borane, hydrazine and hydrogen), because of already completing the adjustment of the particle size of the catalyst particles in the stage of having formed the composite complex. In contrast to this, a conventional method of making a carrier carry atomic metals essentially requires a heat treatment step for making atomic metals cohere into the catalyst particle after reduction treatment, because of not causing cohesion in atomic catalyst particles by reduction treatment with the same level as the reduction treatment to be performed for the present catalyst.

The catalyst according to the present invention is useful in an application field requiring the durability of not lowering activity even when used at high temperature for a long period of time, such as an application field for cleaning an automotive exhaust gas. When the catalyst is used in the application field, it can be applied to a catalyst for a diesel engine and a catalyst for a lean-burn engine, in addition to a catalyst for a general gasoline engine.

In addition, the catalyst according to the present invention shows more preferable characteristics, by making a carrier carry an alkali metallic element, an alkaline earth metal element or a rare earth metal element, in a form of an auxiliary catalyst particle. When the catalyst is used for cleaning a diesel exhaust gas for instance, the catalyst can improve its activity and keep NOx occlusion ability, by carrying an alkali metal element. In addition, in a field of cleaning the diesel exhaust gas, a catalyst system (DPNR) for simultaneously cleaning NOx and PM (particulate matter) has been investigated, and the catalyst having an auxiliary metal carried thereon according to the present invention is suitable to the DPNR catalyst as well.

The catalyst according to the present invention is useful for the catalyst to be supplied to various uses in addition to the application filed of an automotive exhaust gas, and is particularly useful in use which requires the catalyst to have high initial activity right after having been produced, and be hardly degraded after having been heated to high temperature, like in use for combusting/cleaning VOC (volatile organic compound). The catalyst according to the present invention combusts the hydrocarbon (toluene) into a reaction intermediate (benzoic acid), and at the same time can rapidly combust the reaction intermediate.

It is also useful for a catalyst used in a field of cleaning VOC to have an auxiliary metal carried thereon. When the present catalyst having high reaction activity combusts/decomposes hydrocarbon such as olefins and aromatic hydrocarbon at a low cleaning temperature, the rate-determining step is a step of cleaning an organic acid which is an intermediate formed during a combustion reaction of the hydrocarbon. For instance, when toluene is combusted, it is finally decomposed into carbon dioxide and water through combustion, but the combustion reaction proceeds through a step of forming the reaction intermediate of benzoic acid on the way. Then, in order to efficiently combust toluene, it is necessary to proceed the reaction of combusting benzoic acid into carbon dioxide and water, simultaneously with the reaction of combusting toluene into benzoic acid. In this regard, the catalyst according to the present invention having a basic metal such as an alkali metal element, an alkaline earth metal element and a rare earth metal element carried thereon as an auxiliary metal can more effectively function, because the catalyst strongly adsorbs the organic acid of the reaction intermediate, and retains it thereon for a longer time.

BEST MODE FOR CARRYING OUT THE INVENTION

Figure 1:
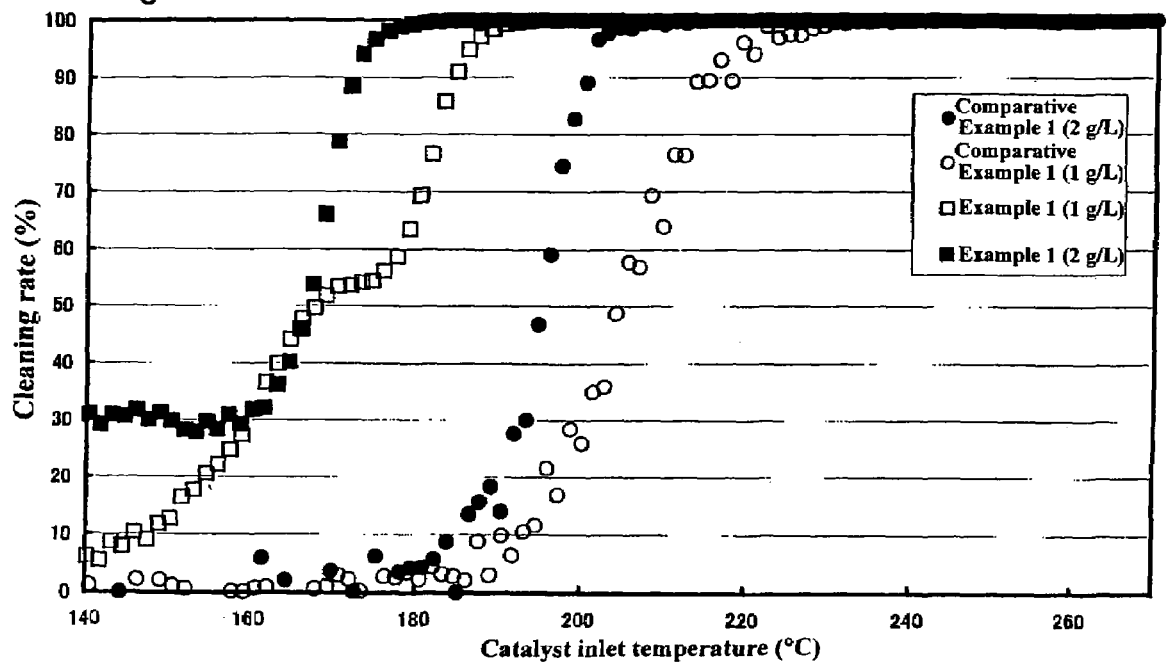
FIG. 1 is a view showing a performance of a catalyst according to Example 1 and Comparative Example 2 for toluene cleaning.

In the next place, a preferred embodiment according to the present invention will be described together with a comparative example. The present embodiment describes the test results of catalysts when used (A) in an initial-activity-oriented field like a catalyst for cleaning VOC (catalyst used at lower than 600° C.) and (B) in a field of requiring durability like a catalyst for cleaning an exhaust gas (catalyst which is heated at a high temperature of 800 to 1,000° C. for a long period). The present embodiment further describes the test results for (C) examining an effect of having add an auxiliary metal.

A: Examination on Initial Activity

EXAMPLE 1

Pt/Pd/Al$_2$O$_3$ Catalyst

A nitric acid solution of dinitrodiammineplatinum in an amount of 17.84 g (Pt concentration 4.54 wt %) and a palladium nitrate solution in an amount of 4.32 g (Pd concentration 4.40 wt %) were made up to 100 mL with distilled water to produce a metal salt solution. On the other hand, 2.21 g of polyethyleneimine (PEI) with an average molecular weight of 50,000 was made up to 100 mL with the distilled water. Then, 4 mL of the PEI solution was mixed with 10 mL of the metal salt solution, the mixture solution was stirred and then was added dropwise to the solution having 10 g of alumina dispersed therein, ammonia was added dropwise to the solution till the pH reaches 10, and a composite complex was absorbed onto a carrier of the alumina.

Subsequently, a dispersion having the carrier dispersed therein was heated to 50° C., 30 mL of a 3 wt % aqueous dimethylamine borane solution was added dropwise to the dispersion for one hour, and the dispersion was kept at 50° C. and stirred for two hours to reduce Pt. Afterwards, the dispersion was filtered, and the obtained powder was dried overnight at 110° C. and then was calcined at 450° C. in the air for two hours to form a Pt/Pd/Al$_2$O$_3$ catalyst.

EXAMPLE 2

Pt/Pd/Al$_2$O$_3$ Catalyst (With Reduction Treatment Skipped)

Alumina having a composite complex adsorbed which had been produced in Example 1 was dried at 110° C., and then was calcined in the air at 450° C. for two hours to form a Pt/Pd/Al$_2$O$_3$ catalyst, while reduction treatment was skipped.

EXAMPLE 3

Pt/Al$_2$O$_3$ Catalyst (With Reduction Treatment)

The metal salt solution prepared in Example 1 was produced by using only the nitric acid solution of dinitrodiammineplatinum in an amount of 22.03 g (Pt concentration 4.54 wt %), and except this matter, the Pt/Al$_2$O$_3$ catalyst was obtained in the same method as in Example 1.

COMPARATIVE EXAMPLE 1

Pt/Pd/Al$_2$O$_3$ (Carried in Atomic State)

A nitric acid solution of dinitrodiammineplatinum in an amount of 1.78 g (Pt concentration 4.54 wt %) and a palladium nitrate solution in an amount of 0.43 g (Pd concentration 4.40 wt %) were added dropwise to a dispersion formed of 10 g of alumina dispersed in 30 ml of water, and the mixture was stirred for 30 minutes to make atomic platinum and palladium adsorbed onto a carrier. Afterwards, the dispersion was filtered, and the obtained powder was dried overnight at 110° C. and then was calcined at 450° C. in the air for two hours to form a Pt/Pd/Al$_2$O$_3$ catalyst.

COMPARATIVE EXAMPLE 2

Pt/Al$_2$O$_3$ (Carried in Atomic State)

Similarly in Comparative Example 1, only the nitric acid solution of dinitrodiammineplatinum of 2.20 g (Pt concentration 4.54 wt %) was added dropwise to an alumina dispersion of 10 g (solvent: 30 mL water), and except this matter, a Pt/Al$_2$O$_3$ catalyst was obtained in the same method as in Comparative Example 1.

Reaction Activity Test 1

The catalyst produced in the above-described method was subjected to a propylene decomposition reaction test, and a 50% conversion temperature was measured. The reaction test was carried out for the catalysts right after having been produced and after having been heat-treated, on the conditions described below, with the use of a fixed bed flow reaction apparatus. The result is shown in Table 1.

Reaction Test Conditions
propylene concentration: 640 ppm
oxygen concentration: 2.56% (balance nitrogen)
catalyst quantity (W/F): 0.5 g-cat min/L
catalyst heat treatment temperature: 800° C. for 50 hours right after production

TABLE 1

| | Production condition | | 50% conversion temperature | |
|---|---|---|---|---|
| | Carrier | Metal particle | Right after production | 800° C. × 50 hr |
| Example 1 | $Al_2O_3$ | Pt/Pd complex | 92 | 134 |
| Example 2 | | Pt/Pd complex (with reduction skipped) | 122 | 124 |
| Example 3 | | Pt complex | 132 | 260 |
| Comparative Example 1 | $Al_2O_3$ | Pt/Pd in atomic state | 161 | 136 |
| Comparative Example 2 | | Pt in atomic state | 192 | 267 |

It is understood from Table 1 that a catalyst having a composite complex carried thereon in Examples 1 to 3 has high activity in a fresh state right after having been produced. The catalyst particularly according to Example 1 shows remarkably high activity. On the other hand, as for activity after having been heat-treated, the catalyst according to Example 2 shows little difference between activities before and after heat treatment. As for a difference of characteristics between a reduction-treated catalyst and a catalyst with reduction treatment skipped after having been produced through a composite complex, the catalyst with reduction treatment skipped shows inferior activity right after production to the reduction-treated catalyst, but shows a less deterioration of the activity after having been heated at a high temperature than the reduction-treated catalyst does. From the fact, it is understood that the reduction-treated catalyst is suitable for use in an environment in which a catalytic layer temperature is kept comparatively low (lower than 600° C.), and the catalyst with reduction treatment skipped is suitable for use in an environment at a comparatively higher temperature (600° C. or higher), so that it is useful to use each for different purposes. In addition, the catalyst according to Comparative Example 1 has improved activity due to heat treatment, which is because atomic metals migrate and are concentrated by heat treatment to form an alloy particle. However, it is difficult for the atomic metals to form the alloy particles with a uniform composition only by the heat treatment, because platinum and palladium have each different adsorption characteristics, so that the catalyst according to Comparative Example 1 cannot enhance its catalytic activity to a level of Examples 1 and 2. In addition, it is confirmed that the improvement of the activity shown in Comparative Example 1 is transitory, and that the catalyst particles are coarsened with the increase of a heating period of time and deteriorate the activity.

Reaction Activity Test 2

Subsequently, a honeycomb catalyst body was produced by using a catalyst according to Example 1 and Comparative Example 2 (which is a generally used catalyst for cleaning VOC), and was subjected to a cleaning test of toluene. The catalyst body used in the test was produced by the steps of: forming a slurry (solvent: water) of the catalyst; immersing a honeycomb structure (material=20Cr-5Al—Fe) which was a catalyst support; and adjusting the amounts of a precious metal carried on the structure to 2 g/L and 1 g/L. Then, the activity was evaluated by passing a toluene-containing gas (toluene concentration 300 ppm) through the catalyst body at a SV of 60000 $h^{-1}$, and measuring a cleaned rate of the gas while changing a catalyst temperature at the inlet.

FIG. 1 shows the test result. As is understood from FIG. 1, it was confirmed that a catalyst body using the catalyst according to Example 1 shows a lower cleaning temperature than the catalyst according to Comparative Example 1. Such a tendency did not change in samples with a different amount of a carried precious metal, and it was confirmed that the catalyst according to Example 1 has high initial activity and is useful as a catalyst for cleaning VOC.

B: Examination on Durability

EXAMPLE 4

$Pt/Rh/Al_2O_3$ Catalyst

A metal salt solution was prepared by mixing 18.06 g of a nitric acid solution of dinitrodiammineplatinum (Pt concentration 4.54 wt %) with 1.81 g of a nitric acid rhodium solution (Rh concentration 10.0 wt %), in place of 17.84 g of a nitric acid solution of dinitrodiammineplatinum (Pt concentration 4.54 wt %) and 4.32 g of a palladium nitrate solution (Pd concentration 4.40 wt %) used in Example 1, and making them up to 100 mL with distilled water. As for the other steps, the same steps as in Example 1 were employed.

EXAMPLE 5

$Pt/Rh/Al_2O_3$ Catalyst (With Reduction Treatment Skipped)

A carrier having a mixed solution (composite complex) carried thereon, which had been prepared in Example 4, was dried at 110° C. and was used as a catalyst as it is.

COMPARATIVE EXAMPLE 3

$Pt/Rh/Al_2O_3$ (Carried in Atomic State)

The metal salt solution was prepared by mixing the nitric acid rhodium solution and the nitric acid solution of dinitrodiammineplatinum as were used in Example 4, in place of only a nitric acid solution of dinitrodiammineplatinum as was used in Comparative Example 2, and was employed. As for the other steps, the same steps as in Comparative Example 2 were employed.

The catalyst produced as described above was at first subjected to the measurement of the amount of absorbed CO. From the count number obtained when having measured the amount of absorbed CO, a ratio of platinum atoms exposed at the surface among the carried platinum atoms can be calculated, because one platinum atom exposed at the surface adsorbs one molecule of CO. The ratio is called a dispersion degree. The dispersion degree of 1 means that all platinum atoms exist in an atomic state. The smaller the value is, the more platinum atoms cohere and exist (in cluster state). In the test, a catalyst was reduced with hydrogen at 200° C. as pretreatment, and then the amount of absorbed CO was measured with a CO pulse method while using a TCD detector. The result is shown in Table 2.

TABLE 2

| | Production condition | | |
|---|---|---|---|
| | Carrier | Metal particle | Dispersion degree |
| Example 3 | Al$_2$O$_3$ | Pt complex | 0.46 |
| Example 4 | | Pt/Rh complex | 0.47 |
| Example 5 | | Pt/Rh complex (with reduction skipped) | 0.51 |
| Comparative Example 2 | Al$_2$O$_3$ | Pt in atomic state | 0.82 |
| Comparative Example 3 | | Pt/Rh in atomic state | 0.83 |

As is shown in Table 2, catalysts in Comparative Examples 2 and 3 show dispersion degrees of about 0.8, and it was confirmed that most of carried precious metals are dispersed in an atomic state in those catalysts. In contrast to this, the catalysts in Examples 3 to 5 show the dispersion degrees of 0.46 to 0.51, and it was confirmed that the precious metal is carried in a cohering state. The result means that sizes of catalyst particles do not significantly increase, even though the catalyst particles are carried on a carrier with comparatively low interaction such as alumina, and migrate and cohere in a calcining step. In contrast to this, the catalysts according to Examples have the catalyst particles formed into a desired particle size in a stage of having carried the catalyst particles, which is a reason why the catalysts show the above described dispersion degree.

Reaction Activity Test 3

Each catalyst was subjected to a propylene decomposition reaction test, and its 50% conversion temperature was determined. The reaction test was carried out for the catalysts right after having been produced and after having been heat-treated, on the conditions described below, with the use of a fixed bed flow reaction apparatus. The result is shown in Table 3.

Reaction Test Condition
propylene concentration: 640 ppm
oxygen concentration: 2.56% (balance nitrogen)
catalyst quantity (W/F): 0.5 g-cat min/L
heat treatment temperature: right after production, 800° C. for 5 hours, 1,000° C. for 5 hours As is shown in Table 3, catalysts having composite complexes carried thereon according to Examples 3 to 5 show a low conversion temperature from a stage right after having been produced, which means that the catalysts have superior catalytic activity. In addition, when catalysts are heated at a high temperature, the catalysts according to Comparative Examples 2 and 3 having an atomic metal carried on alumina show lower activity with the increase of the heat treatment temperature. This is because catalyst particles were coarsened by heat treatment. In this regard, the catalysts according to Examples 3 to 5 also show lower activity with the increase of a heating temperature. However, the catalysts according to Examples show lower conversion temperatures than those according to Comparative Example, and it is understood that the catalysts according to Examples have higher activity even when used at a high temperature.

Reaction Activity Test 4

Subsequently, it was examined whether the catalytic activity is kept or not, when the catalyst has been heat-treated for a longer period of time. Here, the heat treatment condition was set as described below, while regarding an elapsed time of a catalyst right after having been produced (after having been calcined at 450° C. for two hours) as zero hour. The condition of a reaction test was set to the same condition as described above.

Heat Treatment Condition

800° C.×5 hours
800° C.×50 hours
800° C.×200 hours heating in atmospheric air at the above described temperature for the above described period of time

TABLE 3

| | Production condition | | 50% conversion temperature | | |
|---|---|---|---|---|---|
| | Carrier | Metal particle | Right after production | 800° C. × 5 hr | 1000° C. × 5 hr |
| Example 3 | Al$_2$O$_3$ | Pt complex | 132 | 243 | 259 |
| Example 4 | | Pt/Rh complex | 108 | 213 | 232 |
| Example 5 | | Pt/Rh complex (with reduction skipped) | 116 | 210 | 234 |
| Comparative Example 2 | Al$_2$O$_3$ | Pt in atomic state | 192 | 254 | 263 |
| Comparative Example 3 | | Pt/Rh in atomic state | 178 | 238 | 248 |

TABLE 4

| | Production condition | | 50% conversion temperature | | | |
|---|---|---|---|---|---|---|
| | Carrier | Metal particle | Right after production | 800° C. × 5 hr | 800° C. × 50 hr | 800° C. × 200 hr |
| Example 3 | $Al_2O_3$ | Pt complex | 132 | 243 | 260 | 272 |
| Example 4 | | Pt/Rh complex | 108 | 213 | 227 | 233 |
| Example 5 | | Pt/Rh complex (with reduction skipped) | 116 | 210 | 228 | 232 |
| Comparative Example 2 | $Al_2O_3$ | Pt in atomic state | 192 | 254 | 267 | 273 |
| Comparative Example 3 | | Pt/Rh in atomic state | 178 | 238 | 242 | 245 |

As is shown in Table 4, catalysts according to Comparative Examples 2 and 3 show such tendency as the activity continues decreasing with the increase of a heat treatment period of time, and show a value of activity in itself lower than those in Examples. The reason underlies whether the catalyst particles migrate and are coarsened, or not, as in the case of the reaction activity test 3.

The above described two combustion tests clearly showed that catalysts according to Examples have excellent catalytic activity and durability, and besides adequately showed that the alloying of catalyst particles greatly affects the characteristics of the catalysts according to Examples. Specifically, the catalyst according to Example 4 shows a lower conversion temperature than the catalyst according to Example 3 by about 30° C. in each temperature range, and shows a better activity. In contrast to this, the catalyst according Comparative Example 3 carrying platinum and rhodium as in the case of Example 4 can merely decrease the conversion temperature by only 20° C. or lower. The fact means that the catalyst in Comparative Example 3 did not form an alloy among a plurality of precious metals though having had carried them thereon with much effort, and consequently could not sufficiently show the effect. In contrast to this, the reason of the above result is attributed to that the catalyst according to Example 4 forms $Rh_2O_3$, RhO and PdO having great affinity with alumina of a carrier, by effectively alloying platinum with rhodium, inhibits catalyst particles from migrating on the carrier (anchor effect), and inhibits the particles from growing.

In addition, it was confirmed that a catalyst with reduction treatment skipped as in Example 5 has excellent characteristics as well. The reason why the catalyst shows such high activity is considered that calcining treatment performed after a composite complex has been carried makes catalyst particles migrate and cohere along with burning down of an organic matter. Accordingly, the same mechanism of making the catalyst particles cohere by calcining as in the case of a conventional method is also expected to work in Comparative Example 3, but when comparing the mechanism of making atomic catalyst particles cohere as in the case of the conventional method, with that of making catalyst particles of which the particle size has been previously adjusted cohere as in the case of the present invention, it can be easily assumed that the former has a limit. The above assumption is supported by the above described test results. For reference sake, it is assumed that such an effect tends to occur on a carrier having low interaction such as alumina.

Subsequently, the same examination as described above was performed on a catalyst using CZO in place of alumina as a carrier.

EXAMPLE 6

Pt/CZO Catalyst

A Pt/CZO catalyst was prepared by using 10 g of CZO in place of 10 g of alumina used as a carrier in Example 3, and in the same steps other than the point as in Example 1. As a result of having observed a catalyst with a TEM after having been dried at 110° C., Pt particles with a size of about 3 nm were confirmed to exist thereon.

EXAMPLE 7

Pt/Pd/CZO Catalyst

A metal salt solution was prepared by mixing 17.84 g of a nitric acid solution of dinitrodiammineplatinum (Pt concentration 4.54 wt %) and 4.32 g of a palladium nitrate solution (Pd concentration 4.40 wt %) in place of a nitric acid solution of dinitrodiammineplatinum used in Example 6, and making them up to 100 mL with distilled water. A Pt/Pd/CZO catalyst was prepared in the same steps other than the above point as in Example 4. As a result of having observed a dried catalyst as well with a TEM, particles with a size of about 3 nm were confirmed to exist thereon, and as a result of having analyzed the composition of the particle with an EDX, Pt and Rh were confirmed to exist in the single particle.

EXAMPLE 8

Pt/Rh/CZO Catalyst

A metal salt solution was prepared by mixing 17.95 g of a nitric acid solution of dinitrodiammineplatinum (Pt concentration 4.54 wt %) with 1.85 g of a nitric acid rhodium solution (Rh concentration 10.0 wt %) in place of a nitric acid solution of dinitrodiammineplatinum used in Example 6, and making them up to 100 mL with distilled water. A Pt/Ph/CZO catalyst was produced in the same steps other than the above point as in Example 6. As a result of having observed a dried catalyst as well with a TEM, particles with a size of about 3 nm were confirmed to exist thereon, and as a result of having analyzed the composition of the particle with an EDX, Pt and Rh were confirmed to exist in the single particle.

COMPARATIVE EXAMPLE 4

Pt/CZO Catalyst (Carried in Atomic State)

A Pt/CZO catalyst was produced by using 10 g of CZO in place of 10 g of alumina used in Comparative Example 2, and in the same steps other than the point as in Comparative Example 1.

COMPARATIVE EXAMPLE 5

Pt/Pd/CZO Catalyst (Carried in Atomic State)

A Pt/Pd/CZO catalyst was produced by using 1.78 g of a nitric acid solution of dinitrodiammineplatinum (Pt concentration 4.54 wt %) and 0.43 g of a palladium nitrate solution (Pd concentration 4.4 wt %) for a metal salt solution to be added dropwise to a CZO dispersion used in Comparative Example 4, and in the same steps other than the point as in Comparative Example 4.

COMPARATIVE EXAMPLE 6

Pt/Rh/CZO Catalyst (Carried in Atomic State)

A Pt/Rh/CZO catalyst was produced by using 1.80 g of a nitric acid solution of dinitrodiammineplatinum (Pt concentration 4.54 wt %) and 0.185 g of an aqueous solution of rhodium nitrate (Rh concentration 10 wt %) for a metal salt solution to be added dropwise to a CZO dispersion used in Comparative Example 4, and in the same steps other than the point as in Comparative Example 4.

An amount of CO absorbed to the above described catalysts was measured in the same method as described above. The result is shown in Table 5.

TABLE 5

| | Production condition | | |
|---|---|---|---|
| | Carrier | Metal particle | Dispersion degree |
| Example 6 | CZO | Pt complex | 0.41 |
| Example 7 | | Pt/Pd complex | 0.45 |
| Example 8 | | Pt/Rh complex | 0.42 |
| Comparative Example 4 | CZO | Pt in atomic state | 1.18 |
| Comparative Example 5 | | Pt/Pd in atomic state | 1.09 |
| Comparative Example 6 | | Pt/Rh in atomic state | 1.12 |

As shown in Table 5, catalysts in Comparative Examples show dispersion degrees close to 1, whereas the catalysts in Examples show the dispersion degrees of less than 0.5, which means that the precious metal in these Examples is carried in a cohering state, similarly in catalysts using an alumina carrier. But, catalysts having metals carried in an atomic state on a CZO carrier containing ceria show higher dispersion degrees than the catalysts having the metals carried on an alumina carrier. The reason is considered to be because catalyst particles on the catalyst using the alumina carrier cohere to some extent in a calcining step, but catalyst particles on the catalyst using the CZO carrier almost do not cause cohesion even in a calcining atmosphere, because the strong interaction of the CZO carrier limits the migration of them.

Reaction Activity Test 5

Each catalyst was subjected to a propylene decomposition reaction test, and its 50% conversion temperature was determined. The reaction test was conducted in the same method and condition as those in the reaction activity test 3. The result is shown in Table 6.

TABLE 6

| | Production condition | | 50% conversion temperature | | |
|---|---|---|---|---|---|
| | Carrier | Metal particle | Right after production | 800° C. × 5 hr | 1000° C. × 5 hr |
| Example 6 | CZO | Pt complex | 148 | 212 | 218 |
| Example 7 | | Pt/Pd complex | 134 | 173 | 169 |
| Example 8 | | Pt/Rh complex | 141 | 182 | 184 |
| Comparative Example 4 | CZO | Pt in atomic state | 254 | 328 | 302 |
| Comparative Example 5 | | Pt/Pd in atomic state | 262 | 302 | 289 |
| Comparative Example 6 | | Pt/Rh in atomic state | 248 | 318 | 298 |

Reaction Activity Test 6

Subsequently, it was examined whether the catalytic activity is kept or not, when the catalyst has been heat-treated for a longer period of time. The reaction test was conducted in the same method and condition as those in the reaction activity test 4. The results are shown in Table 7.

TABLE 7

| | Production condition | | 50% conversion temperature | | | |
|---|---|---|---|---|---|---|
| | Carrier | Metal particle | Right after production | 800° C. × 5 hr | 800° C. × 50 hr | 800° C. × 200 hr |
| Example 6 | CZO | Pt complex | 148 | 212 | 213 | 210 |
| Example 7 | | Pt/Pd complex | 134 | 173 | 171 | 169 |
| Example 8 | | Pt/Rh complex | 141 | 182 | 187 | 187 |

TABLE 7-continued

| | Production condition | | 50% conversion temperature | | | |
|---|---|---|---|---|---|---|
| | Carrier | Metal particle | Right after production | 800° C. × 5 hr | 800° C. × 50 hr | 800° C. × 200 hr |
| Comparative Example 4 | CZO | Pt in atomic state | 254 | 328 | 328 | 332 |
| Comparative Example 5 | | Pt/Pd in atomic state | 256 | 302 | 299 | 296 |
| Comparative Example 6 | | Pt/Rh in atomic state | 248 | 318 | 321 | 320 |

As shown in the above two activity tests on catalysts using a CZO carrier, both of Examples and Comparative Examples show a tendency of deteriorating activity along with the increase of a reaction temperature and a reaction period of time, which is the same tendency as shown in catalysts using an alumina carrier. However, the catalysts according to Examples have saturation points in relations between a conversion temperature and increasing heating temperatures and between the conversion temperature and increasing heating periods of time, and do not deteriorate the activity even when the heating temperature or the heating period of time increases. For instance, the catalyst according to Example 7 shows the conversion temperature of 134° C. right after having been produced, and shows the conversion temperature of 173° C. after having been heated at 800° C. for five hours, which means that the activity is deteriorated. However, the catalyst shows the conversion temperature of about 170° C. even after having been heated at a higher temperature (1,000° C.) or for a longer period of heating time (50 hours and 200 hours), which is almost constant (or occasionally shows even enhanced activity). Catalysts of an alumina carrier (Examples 1 to 3) do not show a phenomenon of causing such a clearly appearing saturation point. Accordingly, the catalysts according to Examples 6 to 8 are preferable only from the viewpoint of durability.

On the other hand, catalysts according to Comparative Examples 4 to 6 also show a saturation point in the deterioration of activity, which in itself is similar in the case of Examples 6 to 8. However, the catalysts according to these comparative examples have originally low activities which are lower than those of the catalysts of an alumina carrier according to Comparative Examples 1 and 2.

The reason why catalysts according to Examples 6 to 8 and Comparative Examples 4 to 6 using the CZO carrier showed the above described behavior is due to the interaction of a CZO carrier. Specifically, the catalysts according to Examples 4 to 6 show high initial activity, because of carrying cluster-shaped catalyst particles in a carrying step, and can keep the activity after having been heat-treated later, because of making the catalyst particles not cohere during the heat treatment while co-operating with the interaction of the CZO carrier. Particular, the catalysts having an alloy consisting of a plurality of catalytic metals like Examples 7 and 8 show the extremely high initial activity and an effect of inhibiting the deterioration of the activity.

On the other hand, catalysts having a catalytic metal carried in an atomic state according to Comparative Examples can not migrate the catalytic metal dispersedly carried at random on the carrier even after having been calcined and heat-treated in a subsequent reaction test, due to the interaction of the carrier. Accordingly, catalyst particles keep the particle size without cohering with each other even when heat-treated after having been produced, and have the activity inhibited from deteriorating. However, the catalysts do not almost make the catalyst particles cohere in an initial stage right after production, and accordingly show low activity even though capable of keeping the activity. In addition, in the results of those relating tests, the catalysts according to Comparative Examples 5 and 6 show that it is difficult to alloy catalytic metals carried in an atomic state, though the catalysts were prepared so as to achieve the purpose. This is attributed to be because the catalyst particles dispersively carried at random in an atomic state on the carrier having strong interaction such as CZO extremely hardly migrate and form the alloy, and because the catalyst after having been calcined on a normal condition did not almost change from the state right after having carried the catalyst particles thereon.

In the above, the examination results on catalysts using two types of alumina and CZO as carriers were described, and showed a more or less different tendency in durability. However, the difference comes from whether the interaction of the carrier in itself is strong or weak. In the present invention, (1) a catalyst can carry directly clustered catalyst particles thereon in a carrying step, and thereby improve activity in itself; and (2) as for the catalyst having alloyed catalyst particles carried thereon, the catalyst can carry the catalyst particles which are alloyed as designed in the carrying step, without relying on calcining treatment. Accordingly, a catalyst produced according to the present invention develops the above described two effects regardless of a type of a carrier, no matter how the behavior differs depending on the type of the carrier, so that a preferable catalyst can be obtained by selecting the carrier corresponding to use (reaction temperature and atmosphere) and required characteristics (activity-oriented or durability-oriented), and by applying the present invention to the carrier.

C-1: Examination on Auxiliary Metal (Application to NOx Occlusion Reduction Type Catalyst)

Here, a catalyst having barium of an auxiliary metal carried thereon was produced and was subjected to the evaluation for the performance as an NOx occlusion reduction type catalyst.

EXAMPLE 9

Pt/Rh/Ba/Al$_2$O$_3$ Catalyst

A composite complex was prepared by mixing 3.97 g of a nitric acid solution of dinitrodiammineplatinum (Pt concentration 4.54 wt %) with 0.20 g of a nitric acid rhodium solution (Rh concentration 10.0 wt %), and further mixing the mixture with 1.92 g of polyethyleneimine having an average molecular weight of 50,000. Then, the solution was added dropwise to a dispersion having 20 g of alumina dispersed therein, the mixture was stirred for 30 minutes, ammonia was added to make alumina adsorb a composite complex, then the dispersion was filtered, the obtained powder was dried at 110° C., the dried powder was reduced in a 3% hydrogen/nitrogen gas stream at 500° C. for one hour, and the reduced powder was further calcined in the air at 450° C. for two hours.

Afterwards, the powder was immersed overnight in a solution having 10.22 g of barium acetate dissolved in 30 mL of water, and then the dispersion was evaporated to dryness. A Pt/Rh/Ba/Al$_2$O$_3$ catalyst was produced by drying the obtained powder at 110° C., and calcining it in the air at 600° C. for three hours.

EXAMPLE 10

Pt/Rh/Ba/Al$_2$O$_3$ Catalyst (With Reduction Treatment Skipped)

A Pt/Rh/Ba/Al$_2$O$_3$ catalyst was produced by drying alumina at 110° C. prepared in Example 4 and having a composite complex adsorbed thereto, calcining it in the air at 450° C. for two hours while skipping reduction treatment to form a catalyst (Pt/Rh/Al$_2$O$_3$ catalyst), and making it carry Ba as in the case of Example 4.

COMPARATIVE EXAMPLE 7

Pt/Rh/Ba/Al$_2$O$_3$ Catalyst (Carried in Atomic State)

A powder was prepared by mixing 3.97 g of a nitric acid solution of dinitrodiammineplatinum (Pt concentration 4.54 wt %) with 0.20 g of a nitric acid rhodium solution (Rh concentration 10.0 wt %), adding the solution dropwise into a dispersion having 20 g of alumina dispersed therein, making the composite complex adsorbed to alumina, and filtering the dispersion; was dried at 110° C.; and was calcined in the air at 450° C. for two hours.

Then, the powder was immersed overnight in a solution having 10.22 g of barium acetate dissolved in 30 mL of water, and subsequently, the dispersion was evaporated to dryness. A Pt/Rh/Ba/Al$_2$O$_3$ catalyst was produced by drying the obtained powder at 110° C., and calcining it in the air at 600° C. for three hours.

Reaction Activity Test 7

Subsequently, catalysts according to Examples 9 and 10 and Comparative Example 7 were subjected to a measurement for the amount of occluded NOx. The test was conducted by bringing each catalyst into contact with a reaction gas containing NOx having a composition described below, making it occlude the gas till the occlusion amount is saturated, and measuring the amount of occluded NOx with TG-DTA (heat mass-differential thermal analysis). The result is shown in Table 8.

reaction gas composition: 1,000 ppm carbon monoxide oxygen 5% nitrogen balance reaction temperature: 300° C.

reaction gas flow rate: 250 mL/min g(cat.)

TABLE 8

| | Production condition | | Occluded NOx amount (mg/g-cat) | |
|---|---|---|---|---|
| | Carrier | Metal particle | Right after production | 800° C. × 5 hr |
| Example 9 | Al$_2$O$_3$ | Pt/Rh + Ba complex | 21.5 | 13.3 |
| Example 10 | | Pt/Rh + Ba complex (with reduction skipped) | 17.3 | 14.6 |
| Comparative Example 7 | Al$_2$O$_3$ | Pt/Rh + Ba in atomic state | 12.6 | 8.2 |

It was confirmed from Table 8 that catalysts produced through a composite complex according to Examples 9 and 10 had occluded a more excellent amount of NOx than a conventional catalyst carrying an atomic metal. This superiority was maintained after having had heated at a high temperature as well.

C-2: Examination on Auxiliary Metal (Application to VOC Catalyst)

Here, a catalyst was produced by making the catalyst according to Example 1 carry potassium as an auxiliary metal, and was subjected to a cleaning test for toluene.

In the test, a catalyst body was produced as in the case of a reaction test 2 by the steps of: forming a slurry (solvent=water) of a catalyst; mixing potassium carbonate with the slurry; and immersing a honeycomb structure in the resultant slurry. The catalyst body was controlled so as to carry 1 g/L of a precious metal and 0.5 g/L of potassium. Then, the activity was evaluated by passing a toluene-containing gas (toluene concentration 300 ppm) through the catalyst body at a SV of 60,000 h$^{-1}$, and measuring a cleaned rate of the gas while changing a catalyst temperature at the inlet.

Figure 2:
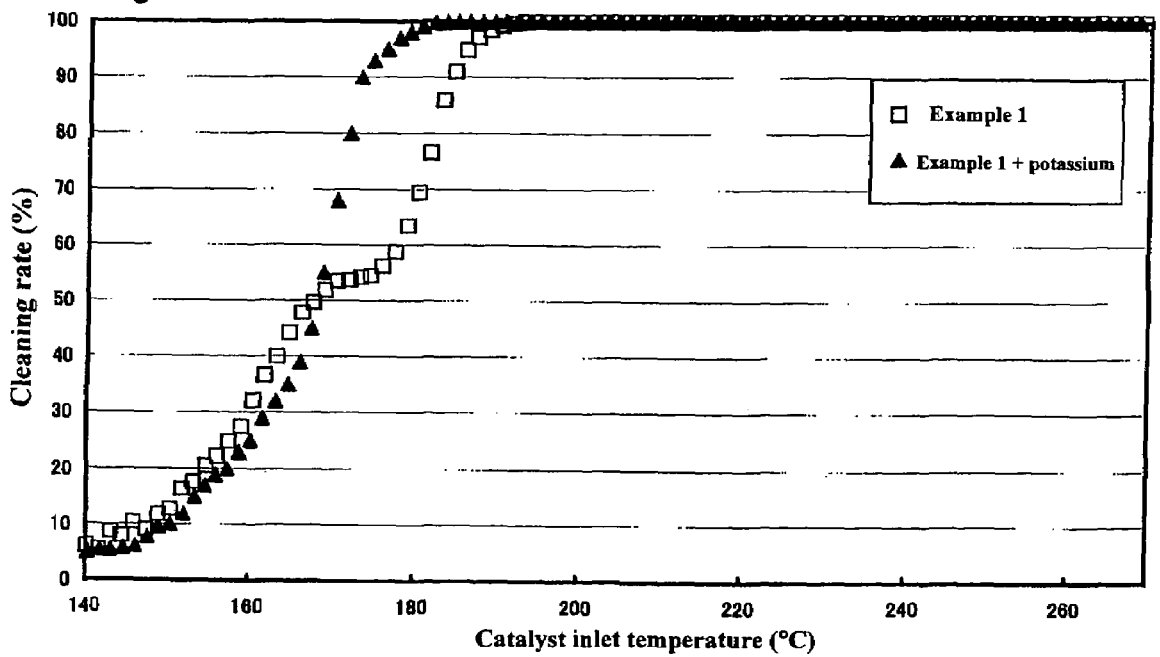
FIG. 2 is a view showing a performance of a catalyst containing potassium in Example 1 for toluene cleaning.

FIG. 2 shows this test result. FIG. 2 shows a result as well on a catalyst containing no potassium according to Example 1. As shown in FIG. 2, a catalyst containing potassium of an auxiliary metal shows a cleaning temperature shifted to a lower temperature side than the catalyst containing no potassium in Example 1, and accordingly it is understood that the former catalyst has higher activity for VOC cleaning. In this regard, a catalyst according to Example 1 requires a comparatively high temperature in order to completely decompose toluene (though requiring far lower temperature than Comparative Example 1), because the rate-determining step in a toluene conversion reaction is a step of decomposing benzoic acid of a reaction intermediate. The reason why the catalyst containing potassium could decompose toluene at a lower temperature is attributed to the catalyst acquired more adsorption sites for benzoic acid through containing potassium, and promoted the decomposition of benzoic acid.

The invention claimed is:

1. A method for producing a catalyst comprising the steps of: producing a metal salt solution containing salts of one or more metals; dispersing the metal salt solution, an organic matter and a porous carrier made of one or more metal oxides in a solvent to form a composite complex comprising one or more metal ions having 10 to 50,000 atoms and the organic matter bonded to the metal ions, and to simultaneously make the composite complex carried on the porous carrier; and calcining the carder having the composite complex carried thereon, and wherein the composite complex is reduced before or after calcining the carrier having carried the composite complex thereon.

2. The method of claim 1 wherein the porous carrier comprises one or more metal oxides or carbon.

3. The method according to claim 1, wherein the composite complex is soluble in water.

4. The method according to claim 1, wherein the organic matter composing the composite complex has at least one of nitrogen, a carboxyl group, a carbonyl group and an alcohol group.

5. The method according to claim 1, wherein the one or more metal ions comprise of one or more of platinum, palladium, rhodium, ruthenium, silver, gold and iridium.

6. The method according to claim 1, wherein the porous carrier comprises at least one of ceria, ceria-zirconia, ceria-zirconia-yttria, alumina, silica, titania and zirconia.

7. The method according to claim 1, wherein the porous carrier comprises at least one of aluminum, zirconium, silicon, titanium, lanthanum, cerium, neodymium and yttrium.

8. The method according to claim 1, further comprising at least one of an alkali metal element an alkaline earth metal element and a rare earth metal element carried thereon.

9. The method according to claim 8, wherein the alkali metal element is lithium, sodium, potassium, rubidium or cesium.

10. The method according to claim 8, wherein the alkaline earth metal element is magnesium, calcium, strontium or barium.

11. The method according to claim 8, wherein the rare earth metal element is lanthanum or cerium.

12. The method for producing a catalyst according to claim 1, wherein the organic matter has at least one of nitrogen, a carboxyl group, a carbonyl group and an alcohol group.

13. The method for producing a catalyst according to claim 12, wherein the organic matter comprises at least one of polyacrylic acid, polymethacrylic acid, polyethyleneimine, polyallylamine, polyvinylpyrrolidone, polyvinyl alcohol, poly(N-carboxymethyl)ethyleneimine, N-dicarboxymethyl)arylamine, or a copolymer containing one or more thereof.

14. The method for producing a catalyst according to claim 12, wherein the organic matter is comprises polyamino acid or polysaccharide.

15. The method according to claim 1, wherein the composite complex is soluble in water.

16. The method according to claim 1, wherein the organic matter composing the composite complex has at least one of nitrogen, a carboxyl group, a carbonyl group and an alcohol group.

17. A method for producing a catalyst comprising the steps of: producing a metal salt solution containing salts of one or more metals; dispersing the metal salt solution, an organic matter and a porous carrier made of one or more metal oxides in a solvent to form a composite complex comprising one or more metal ions having 10 to 50,000 atoms and the organic matter bonded to the metal ions, and to simultaneously make the composite complex carried on the porous carrier; and calcining the carrier having the composite complex carried thereon, and further comprising a step of reducing the metal ions on the porous carrier by reducing the carrier after the step of making the composite complex carried on the carrier and before or after calcining the carrier, and then calcining the carrier after the reduction step.

* * * * *